United States Patent [19]

Currie et al.

[11] Patent Number: 4,730,239
[45] Date of Patent: Mar. 8, 1988

[54] DOUBLE LAYER CAPACITORS WITH POLYMERIC ELECTROLYTE

[75] Inventors: John C. Currie, Novelty; Linda F. DiFranco, Mayfield Heights, both of Ohio; Phillip D. Bennett, Gainesville, Fla.

[73] Assignee: Stemcor Corporation, Cleveland, Ohio

[21] Appl. No.: 924,525

[22] Filed: Oct. 29, 1986

[51] Int. Cl.$^4$ .............................................. H01G 9/00
[52] U.S. Cl. .................................................... 361/433
[58] Field of Search .................. 29/570; 361/433, 323

[56] References Cited

U.S. PATENT DOCUMENTS

| | | | |
|---|---|---|---|
| 1,709,427 | 4/1929 | Bush | 361/433 X |
| 3,634,736 | 1/1972 | Boos et al. | 317/230 |
| 3,700,975 | 10/1972 | Butherus et al. | 361/433 |
| 4,303,748 | 12/1981 | Armand et al. | 429/192 |
| 4,327,400 | 4/1982 | Muranaka et al. | 361/433 |
| 4,471,037 | 9/1984 | Bannister | 429/191 |
| 4,556,615 | 12/1985 | Bannister | 429/192 |
| 4,562,511 | 12/1985 | Nishino et al. | 361/433 X |
| 4,576,882 | 3/1986 | Davis et al. | 429/192 |
| 4,626,964 | 12/1986 | Azuma et al. | 361/433 |
| 4,638,407 | 1/1987 | Lundsgaard | 361/433 |

FOREIGN PATENT DOCUMENTS 2377  2/1979  Japan ..................................... 29/570

OTHER PUBLICATIONS

"Solid State Micro Power Sources", Satoshi Sekido, Matsushita Electric Industrial Co., Ltd., Solid State Ionics 9 & 10, pp. 777-782 (1983).
"Lithium Ion Conductors of Poly ion Complexes Dispersed with LiClO$_4$ and Their Application to Solid-State Batteris, Shiro Toyota, et al., Dept. of Applied Chemistry, Osaka University, Solid State Ionics 13 (1984) pp. 243-247.

*Primary Examiner*—Donald A. Griffin
*Attorney, Agent, or Firm*—Harold M. Snyder; Jeffrey A. Wyand; Larry W. Evans

[57] ABSTRACT

A solid state double layer capacitor includes an organic electrolyte doped with a soluble salt to render the electrolyte ionically conductive.

24 Claims, 3 Drawing Figures

DOUBLE LAYER CAPACITORS WITH POLYMERIC ELECTROLYTE

BACKGROUND OF THE INVENTION

1. Field of the Invention

This invention is concerned with double layer capacitors and, more particularly, with double layer capacitors having polymeric electrolytes and methods for making such capacitors.

2. Description

Double layer capacitors are disclosed in prior U.S. patents including:

| | |
|---|---|
| 3,536,963 | 3,652,902 |
| 4,327,400 | 4,394,713 |

In general, the above patents describe double layer capacitors which comprise a pair of polarization electrodes having a separating medium therebetween. The electrodes are composed of a solid and liquid phase and the electric double layer which characterizes these capacitors is formed at the interface between the solid and liquid (electrolyte) phases of the electrodes. The separating medium acts as an electronic insulator between the electrodes, but is sufficiently porous to permit ion migration therethrough.

The double layer capacitors disclosed in the prior art are half-cells assembled on either side of a separator element. Each half-cell comprises an electrode element, an enclosing cell wall for the electrode element and a conductor element contacting one end wall of the electrode element. The electrode is made up of high surface area carbon material associated with an electrolyte such as $H_2SO_4$, at a concentration of, say, 25 wt. % $H_2SO_4$. The high surface area or activated carbon used in the electrodes has a surface area in the range from 1400 to 1600 square meters per gram.

The use of a liquid electrolyte, of course, limits the operating temperature range of the capacitors. Further, the electrolyte/activated carbon mixture which is used to form the electrodes is a damp powder which is difficult to handle, particularly in accurately measuring quantities of the powder. Further, the damp powder does not easily fill all corners of the electrode mold volume under reasonable pressure. The difficulty increases when the capacitors must be made in miniature size and in thin configurations.

The following technical articles are directed to developments in the art which are relevant to the present invention:

"Lithium Conductors of Polyion Complexes Dispersed with $LiClO_4$ and Their Application to Solid-State Batteries", by S. Toyota, T. Nogami and H. Mikawa, Solid State Ionics 13 (1984) 243–247, North-Holland, Amsterdam. A polyion complex dispersed with $LiClO_4$ was used in pellet configuration to form capacitors in which the electrolyte pellet is sandwiched between two sheets of activated carbon fiber cloth. Also, polyethylene oxide dispersed with $LiBF_4$ was used as a solid electrolyte in a battery between electrodes of lithium and activated carbon fiber.

"Solid State Micro Power Sources", by S. Sekido, Solid State Ionics 9 & 10 (1983) 777–782, North-Holland Publishing Company. Double layer capacitors utilizing either $Cu^+$ or $Ag^+$ ion conductor have a positive electrode of active charcoal and a negative electrode of either Cu or Ag with the electrodes separated by a solid electrolyte layer. While $Li^+$ ion conductor is mentioned for use in rechargeable power sources, such power sources are stigmatized as impractical.

It will be appreciated that if means could be found to manufacture these double layer capacitors having high surface area electrodes so that they are substantially in the solid state when completed with good electrical properties, that many or all of the disadvantages of capacitors using liquid electrolytes would be avoided.

SUMMARY OF THE INVENTION

In the double layer capacitor of the present invention, the electrolyte is a polymeric material entirely or at least partially in the solid state.

In the description hereafter, it is desired to distinguish between electronic conduction or conductivity and ionic conduction or conductivity. Electronic conduction refers to the situation where electrons are the charge carriers in the conductor. Ionic conduction refers to the circumstance in which ions of the conductor are the charge carriers.

This invention calls for an energy storage device that stores electrical energy in the double layer at a solid electrode/solid electrolyte interface. The electrolyte is a polymeric material such as the polyethers; e.g., polyethylene oxide, or polypropylene oxide, that are made ionically conductive by the addition of a suitable soluble salt. The properties of the electrolyte are improved by using a copolymer or a plasticizer such as a lower molecular weight version of the polyether. However, any combination of polymer and soluble salt that is ionically conductive can be employed as the electrolyte. The electrodes are fabricated of a high surface area material such as carbon fibers, carbon particles or carbon cloth (woven or unwoven) and function to provide polarizable interfaces. The electrochemical cell is comprised of two similar electrodes impregnated with a mixture of low molecular and high molecular weight polymeric material. The former is required to allow wetting of the micropores of the high surface area electrode and the latter to fill the larger voids and encapsulate each particle or fibre. The quantity of polymer added to the high surface area material should be sufficient to wet substantially all of the available surface and also fill all the voids. The electrodes may be electronically insulated or separated by the use of a doped or undoped thin film of the polymeric material or a macroporous polymer physical separator.

The method of the invention includes providing an electrolyte mixture of a high molecular weight polymer, a lower molecular weight polymer plasticizer, a still lower molecular weight solvent and a soluble salt. A high surface area electrode substrate is impregnated with the electrolyte mixture and then subjected to evaporation to remove most of the solvent, leaving the electrode apparently entirely in the solid state. The electrodes are assembled with a polymer separating layer between them. Electrical contacting means are provided at each electrode for connections to an external circuit.

This energy storage device is classified as a capacitor; specifically a double layer capacitor. The device is charged at constant voltage at values up to and including 2.5 volts per single cell and discharged either at constant current or through a fixed resistance load. The current required to maintain the charging voltage; i.e., the leakage current, is typically about 1 to 10 microamperes at charging voltages up to 2.5 volts over a wide range of temperatures for a cell having a cross sectional area of about one square centimeter and in which carbon cloth is used in the electrode.

DETAILED DESCRIPTION OF THE INVENTION

Figure 1:
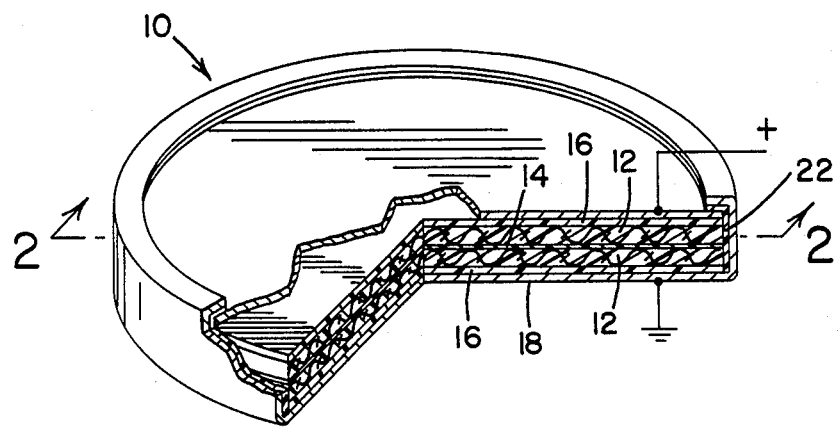
FIG. 1 is a perspective view, partially in section, of the double layer capacitor of the invention.

In FIG. 1 there is shown a typical double layer capacitor 10 of the present invention. The structure of the double layer capacitor comprises a pair of electrodes 12 separated by a separating element 14 with each electrode backed by a conductor element 16. This arrangement of elements is essentially the same as that shown in the prior art, but, of course, in the present invention, the electrolyte employed is a solid or semi-solid (multiphasic) polymer rather than the liquid electrolyte employed in the prior art double layer capacitors. The conductor elements 16 are optional elements as will be more fully described hereinafter.

Figure 2:
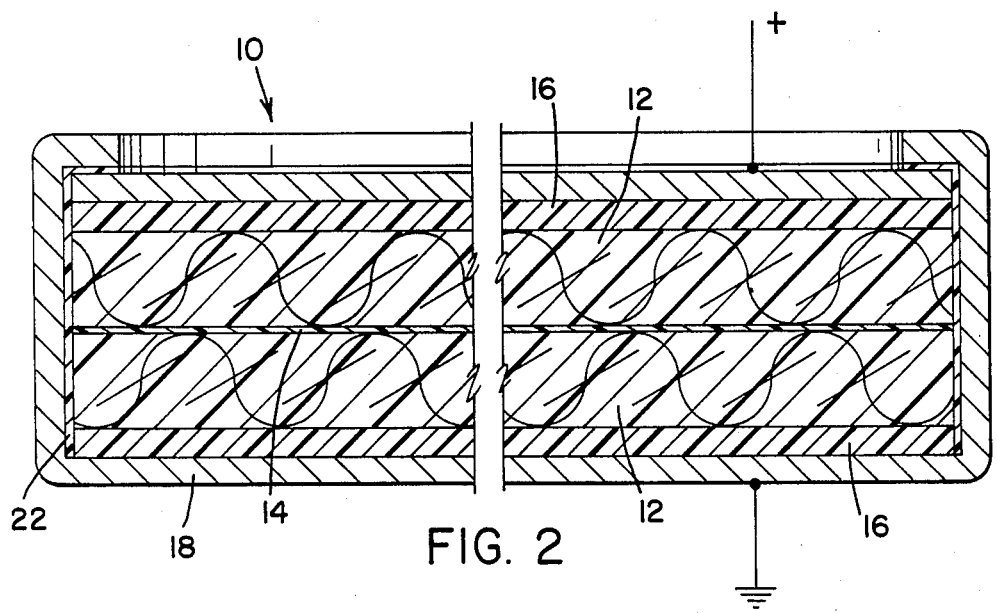
FIG. 2 is an enlarged sectional view taken long line 2—2 of FIG. 1 of a single cell double layer capacitor of the invention comprised of two half-cells.

The enlarged sectional view of FIG. 2 shows the double layer capacitor 10 with its electrodes 12 separated by separator element 14 and backed by optional conductor elements 16. The capacitor is shown enclosed in a container 18, and, because the container is metallic, it is insulated from the electrodes 12 and conductor elements 16 by the insulation element 22.

The underlying structure or substrate of the electrode is a high surface area electronically conductive material. This material requirement may be met by a number of substances such as Raney nickel, particulate silica which has been metallized and various forms of carbon including carbon powder, carbon cloth, carbon felt, graphite (with the graphite surface area enhanced by anodization in 25 wt. % $H_2SO_4$) or carbon cloth which has been impregnated with a polymer/high surface area carbon powder mixture.

In order to achieve high volumetric capacity, the electrolyte may be multiphasic, comprised of liquid, semi-solid and solid regions. The phases occurring in these polymeric electrolytes are determined by the proportion of polymer, plasticizer and solvent employed in the formulation. The electrodes are impregnated with the polymeric electrolyte by solvent casting. The electrodes give the appearance of being entirely solid upon evaporation of the solvent, but it is found that some small amount of solvent is retained in the micropores of the high surface area material after the evaporation step.

In this multiphasic system, the polymer will have the highest molecular weight, the plasticizer an intermediate molecular weight and the solvent the lowest molecular weight.

A soluble salt used to make the polymeric material ionically conductive is $LiClO_4$ (lithium perchlorate), as described in the examples of the invention set forth below. Other soluble salts which may be used for this purpose are: $(C_2H_5)_4NBF_4$ (tetraethylammonium tetrafluoroborate), $(C_2H_5)_4NClO_4$ (tetraethylammonium perchlorate) and $LiBF_4$ (lithium tetrafluoroborate).

Enough of the polymeric electrolyte is solvent cast so that a layer of solid polymer can be seen on the carbon substrate. The separator element is a very thin undoped, unplasticized polymer film or a macroporous polymer physical separator (such as a woven fabric of nylon or polyethylene) whose function is to prevent short-circuiting between the two carbon electrodes. If the carbon electrodes are sufficiently coated with the polymeric electrolyte, carbon will not touch carbon when the electrodes are assembled in the capacitor and a separator element need not be provided. Each of the electrodes is backed by an electronic conductor such as a plastic/rubber electronic conductor in which the plastic/rubber is loaded with carbon particles. This conductor is optional and contact can be made directly to the carbon cloth. It is also practical to metallize the back of the electrode to provide a conductive layer.

EXAMPLE

Preparation of the Electrode

Carbon cloth is utilized as the high surface area material for the electrode. The carbon cloth employed is manufactured by Toyoba (#KFN/1600E) with a thickness of about 16 mils. The carbon cloth is prepared by cutting out disks with a diameter of about 9 mm. weighing about 0.02 g. each. The disks are then soaked in anhydrous methanol overnight to remove soluble contaminants and vacuum baked the next day for at least six hours at 450° C. in vacuum to thoroughly dry them. Prepared disks of carbon cloth are stored in an argon-filled dry box until used.

The carbon fiber cloth of the electrodes is supported by a polymeric/plastic carbon-loaded electronic conductor (one such material is sold under the name Santoprene by the Monsanto Company) which is ironed onto the carbon disks until softened enough to adhere to the cloth. This procedure is carried out in an argon-filled dry box. Once cooled, the Santoprene-backed carbon disk is mounted in a holder held together by a clamp in a manner such that the polymer solution can be pipetted onto the carbon cloth disk from above.

Preparation of the Electrolyte

A preferred electrolyte which has been tested is one consisting of a polyethylene oxide (PEO) of molecular weight 5 million, doped with $LiClO_4$ at an oxygen to lithium ratio of 9:1 and plasticized with a 0.50 mole fraction polyethylene glycol (PEG) of molecular weight 200. The electrodes are impregnated with the doped, plasticized polymer mixture by solvent-casting. The polymer mixture is made up as a 2 gm. % solution in anhydrous acetonitrile ($CH_3CN$), then applied by pipetting onto the supported carbon cloth electrodes.

A typical operative electrolyte solution is 1 g. PEO plus 50 ml. $CH_3CN$ (mixed about 16 hours in the dry box with a Teflon stir bar) to which is added 0.8 g. PEG and 0.6 g. $LiClO_4$ and then mixed thoroughly.

After the polymer is pipetted onto the carbon cloth, the $CH_3CN$ is evaporated off under a stream of dry nitrogen outside the dry box. The amount of polymer pipetted onto the electrodes varies but is of the order of 30–40 mg. Enough polymer is solvent cast that a layer of polymer can be seen on the carbon cloth disk.

It is necessary to cut away any excess conductive polymer around each disk of carbon cloth to prevent short-circuiting of the top and bottom halves of the cell.

The weight of electronically conductive polymer (Santoprene) supporting each carbon disk is about 0.03 g.

The Separator

The separator consists of a plain, undoped, unplasticized PEO film which is prepared by pipetting 5-10 mls. of a 2 gm. % PEO in CH3CN solution into a 57 mm. diameter aluminum weighing dish and evaporating off the solvent under dry nitrogen. The separator thickness is about 1 mil.

Alternately, a macroporous polymer can be used as a physical separator.

Testing of the Solid State Capacitor

Figure 3:
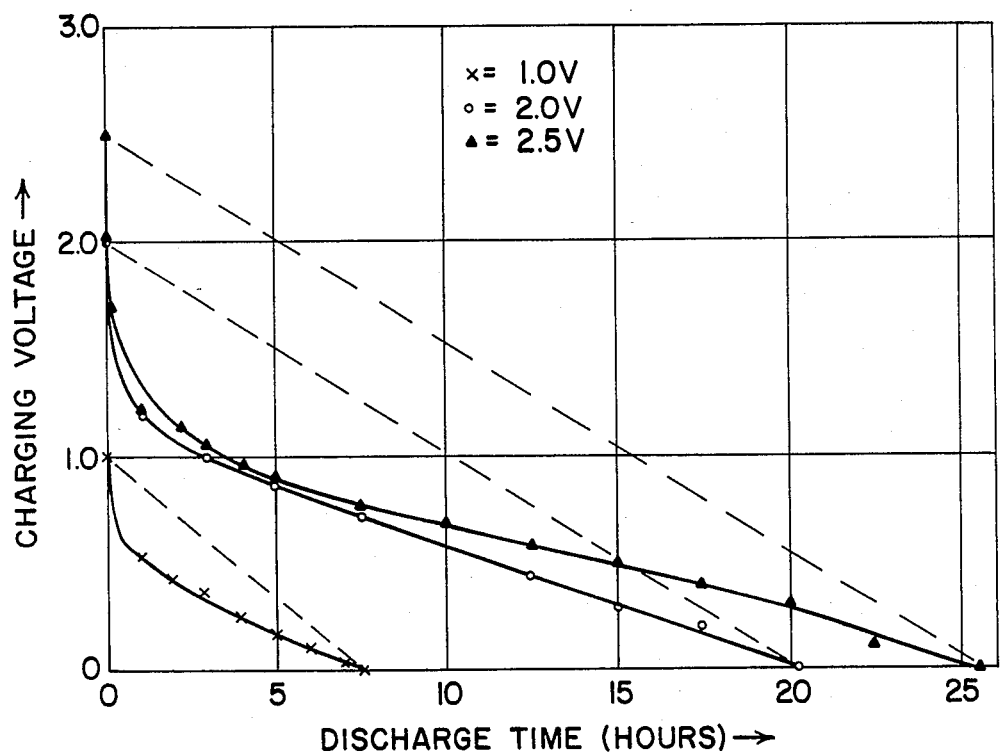
FIG. 3 is a graph in which the voltage of single cell double layer capacitors charged at voltages of 1, 2 and 2.5 volts is plotted against the discharge time under constant current conditions.

The assembled solid state capacitor is tested by placing between two polished stainless steel cylinders. The device is charged at constant voltage at values up to and including 2.5 volts per single cell for at least 48 hours and discharged at either constant current or through a fixed load resistance. The leakage current is monitored and is typically 1-10 microamperes. The discharge current is on the order of 10 microamperes. Typical discharge data at 22° C. is shown in Table I below and discharge curves are illustrated in FIG. 3 obtained by monitoring the decay in voltage of the cell under constant current conditions on a strip chart recorder.

TABLE I

CAPACITOR DISCHARGE DATA

| Charging Voltage (V) | Leakage Current ($\mu$A) | Discharge Time at 10 A (MIN) | Capacitance C = Q/V-Veq (F) |
|---|---|---|---|
| 1.0 | 12 | 453 | 0.39 |
| 2.0 | 21 | 1230 | 0.43 |
| 2.5 | 15 | 1530 | 0.46 |

It is seen from Table I that useful capacitance is obtained in these double layer capacitors over the range of charging voltage 1.0 to 2.5 volts.

Additional data was obtained at two operating temperatures; room temperature (22° C.) and 51° C. using charging voltages of 1.0, 1.5, 2.0 and 2.5. These data are set forth in Table II below.

TABLE II

CAPACITOR DISCHARGE DATA

| TEMP (C.) | CHARGING VOLTAGE (V) | LKGE CURR DENSITY ($\mu$A/sq. cm) | DISCHARGE CURRENT DENSITY ($\mu$A/sq. sm) | SPECIFIC CAPACITY (F/gm) |
|---|---|---|---|---|
| 22 | 1.0 | 0.29 | 10 | 9.25 |
| 22 | 1.5 | 0.56 | 10 | 19.29 |
| 22 | 2.0 | 1.84 | 10 | 26.49 |
| 22 | 2.5 | 1.40 | 10 | 23.26 |
| 22 | 1.0 | 0.01 | 10 | 20.80 |
| 51 | 1.0 | 0.61 | 10 | 29.95 |
| 51 | 2.5 | 15.50 | 10 | 53.88 |
| 51 | 1.0 | 0.44 | 10 | 33.16 |
| 51 | 1.0 | 0.83 | 20 | 27.38 |
| 51 | 1.0 | 1.20 | 30 | 26.60 |
| 51 | 1.0 | 1.17 | 40 | 26.74 |
| 51 | 1.0 | 0.94 | 80 | 25.55 |
| 51 | 1.0 | 0.67 | 100 | 18.68 |

From Table II it is seen that an increase in operating temperature tends to increase both leakage current and capacitance. Further, it is known that the specific energy of a unit cell increases proportionally to the square of the charge voltage. Since double layer capacitors having aqueous electrolytes are limited to a charge voltage of up to about 1.2 volts and the polymeric electrolytes of the present invention permit a charge voltage of 2.5 volts, the double layer capacitors of the invention can have at least five times the specific energy of the aqueous cells. The capacitance attainable in the two types of capacitors generally follows the trend set by the specific energies.

The capacitors tested for Table II contained PEO (5 MM) PEG (0.5 mole fraction) and lithium perchlorate in an amount sufficient to provide an oxygen to lithium ratio of 9:1.

Although the present invention has been described in conjunction with preferred embodiments, it is to be understood that modifications and variations may be resorted to without departing from the spirit and scope of the invention as those skilled in the art will readily understand. Such modifications and variations are considered to be within the purview and scope of the invention and appended claims.

We claim:

1. A double layer capacitor comprising a pair of high surface area electrodes each having an electronically conductive surface on one side thereof, said electrodes comprising carbon in particulate, fiber or cloth form, the high surface area electrodes being impregnated with a multiphasic polymeric electrolyte, said multiphasic electrolyte comprising polymer material doped with a soluble salt to confer ionic conductivity and electronically non-conductive means separating said electrodes to prevent short-circuiting therebetween.

2. The double layer capacitor of claim 1 wherein said polymer material comprises one or more polyethers.

3. The double layer capacitor of claim 2 wherein said polymer material comprises polyethylene oxide.

4. The double layer capacitor of claim 3 wherein said polymer material comprises a plasticizer.

5. The double layer capacitor of claim 4 wherein said plasticizer is polyethylene glycol.

6. The double layer capacitor of claim 5 wherein said polyethylene glycol is present in an amount of up to about 0.5 mole fraction of said polymer material.

7. The double layer capacitor of claim 6 wherein the high surface area electrode comprises carbon cloth.

8. The double layer capacitor of claim 7 wherein said soluble salt is lithium perchlorate and is present in an amount sufficient to provide an oxygen to lithium ratio of 9:1.

9. The double layer capacitor of claim 8 wherein said electronically conductive surface consists of a metallized region on said electrode.

10. The double layer capacitor of claim 8 wherein said electronically conductive surface is provided by a carbon-loaded polymer element in electrical contact with said electrode.

11. The double layer capacitor of claim 6 wherein said soluble salt is selected from the group consisting of $(C_2H_5)_4NBF_4$, $(C_2H_5)_4NClO_4$, $LiBF_4$ and $LiClO_4$.

12. The double layer capacitor of claim 5 wherein said electronically non-conductive means is a non-conductive polymer element interposed between said electrodes.

13. The double layer capacitor of claim 5 wherein said electronically non-conductive means is provided by said multiphasic polymeric electrolyte which is present in sufficient thickness on the surface of one or both said electrodes to prevent carbon-to-carbon contact.

14. The double layer capacitor of claim 2 wherein said polymer material comprises polypropylene oxide.

15. The double layer capacitor of claim 14 wherein said polymer material comprises a plasticizer.

16. The double layer capacitor of claim 15 wherein said plasticizer is polyethylene glycol.

17. The double layer capacitor of claim 16 wherein the high surface area electrode comprises carbon in the form of woven or unwoven cloth.

18. The double layer capacitor of claim 17 wherein said soluble salt is lithium perchlorate and is present in an amount sufficient to provide an oxygen to lithium ratio of 9:1.

19. The double layer capacitor of claim 18 wherein said electronically conductive surface consists of a metallized region on said electrode.

20. The double layer capacitor of claim 18 wherein said electronically conductive surface is provided by a carbon-loaded polymer element in electrical contact with said electrode.

21. The double layer capacitor of claim 18 wherein said electronically non-conductive means is a non-conductive polymer element interposed between said electrodes.

22. The double layer capacitor of claim 18 wherein said electronically non-conductive means is provided by said multiphasic polymeric electrolyte which is present in sufficient thickness on the surface of one or both said electrodes to prevent carbon-to-carbon contact.

23. The double layer capacitor of claim 16 wherein said soluble salt is selected from the group consisting of $(C_2H_5)_4NBF_4$, $(C_2H_5)_4NClO_4$, $LiBF_4$, and $LiClO_4$.

24. The double layer capacitor of claim 1 wherein said soluble salt is selected from the group consisting of $(C_2H_5)_4NBF_4$, $(C_2H_5)_4NClO_4$, $LiBF_4$ and $LiClO_4$.

* * * * *